US008542361B2

(12) United States Patent
Meijer

(10) Patent No.: US 8,542,361 B2
(45) Date of Patent: Sep. 24, 2013

(54) COLOR MATCHING DEVICE AND METHOD

(75) Inventor: Louisa Meijer, Strongsville, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 13/397,249

(22) Filed: Feb. 15, 2012

(65) Prior Publication Data
US 2012/0206728 A1 Aug. 16, 2012

Related U.S. Application Data

(60) Provisional application No. 61/463,370, filed on Feb. 16, 2011.

(51) Int. Cl.
G01J 3/52 (2006.01)
(52) U.S. Cl.
USPC ............................................. 356/421
(58) Field of Classification Search
USPC .................................. 356/402–425
See application file for complete search history.

(56) References Cited

U.S. PATENT DOCUMENTS

| 3,384,983 | A | 5/1968 | Olson |
| 3,633,286 | A | 1/1972 | Maurer |
| 4,692,481 | A | 9/1987 | Kelly |
| 5,217,744 | A | 6/1993 | Little, Jr. |
| 5,254,192 | A | 10/1993 | Speakman |
| 5,371,599 | A | 12/1994 | Falcoff et al. |
| 5,816,269 | A | 10/1998 | Mohammed |
| 5,833,649 | A | 11/1998 | Atef |
| 6,056,419 | A | 5/2000 | March |
| 6,217,934 | B1 | 4/2001 | Eilenberger |
| 6,227,989 | B1 | 5/2001 | Reid |
| 6,230,880 | B1 | 5/2001 | Marco et al. |
| 6,625,935 | B1 | 9/2003 | King et al. |
| 6,647,693 | B2 | 11/2003 | Bromberg |
| 6,717,673 | B1 | 4/2004 | Janssen et al. |
| 6,820,546 | B2 | 11/2004 | Wynne |
| 6,854,915 | B1 | 2/2005 | Ong |
| 6,857,875 | B1 | 2/2005 | McClure |
| 6,982,108 | B2 | 1/2006 | Janssen et al. |
| 6,994,553 | B2 | 2/2006 | DaRif et al. |
| 2004/0179023 | A1 | 9/2004 | Masuda et al. |
| 2005/0135671 | A1 | 6/2005 | Levin et al. |

(Continued)

FOREIGN PATENT DOCUMENTS

| GB | 10431 | 0/1909 |
| GB | 2237777 A | 5/1991 |
| JP | UH4-18877 | 2/1992 |

OTHER PUBLICATIONS

A photocopy of a front view of a "Color checker" device from PPG Industrsies, Pittsburgh, PA, date unkown, but prior to the filing date of the application.

Primary Examiner — Tarifur Chowdhury
Assistant Examiner — Abdullahi Nur
(74) Attorney, Agent, or Firm — Hudak, Shunk & Farine Co. LPA

(57) ABSTRACT

A color matching device including a flexible template having at least three windows extending from a front face through a back face of the template, the windows sized to allow visual comparison of colors located in the windows, wherein at least a first separation distance between first and second windows is different than a second separation distance between the second and third windows. A method for evaluating colors utilizing the device is also disclosed.

20 Claims, 1 Drawing Sheet

(56) References Cited

U.S. PATENT DOCUMENTS

2008/0113167 A1 5/2008 Henry
2009/0021524 A1 1/2009 Lenart-Weary et al.
2011/0026835 A1* 2/2011 Ptucha et al. .............. 382/209

* cited by examiner

COLOR MATCHING DEVICE AND METHOD

CROSS REFERENCE

This application claims the benefit of priority under 35 U.S.C. §119 of U.S. Provisional Application Ser. No. 61/463,370, filed on Feb. 16, 2011, herein fully incorporated by reference.

FIELD OF THE INVENTION

The present invention relates to a color matching device including a flexible template having at least three windows extending from a front face through a back face of the template, the windows sized to allow visual comparison of colors located in the windows, wherein at least a first separation distance between first and second windows is different than a second separation distance between the second and third windows. A method for evaluating colors utilizing the device is also disclosed.

BACKGROUND OF THE INVENTION

It is often necessary to repair a painted surface, for example of a damaged object such as a portion of a vehicle body, machine, etc. or paint a replacement part with a color that will match the current color of a portion of the object, such as an undamaged body portion or part adjacent to the surface or part being repainted.

One prior art method utilized to select a suitable color is to hold a color card of a standard color or a painted panel next to or on top of an undamaged portion or part of the object and visually determine if a color is a suitable match. Several color cards may be utilized in order to determine the closest match.

Another prior color matching method is to spray a relatively small amount of a proposed matching paint or other coating composition onto the area being repaired or colored, after which it is determined whether the paint or composition matches the desired surrounding area. The procedure may need to be repeated multiple times before a suitable match is achieved. Additional methods and devices utilized in color matching include the following U.S. Pat. Nos. 4,692,481, 5,217,744, 5,254,192, 5,371,599, 5,833,649, 6,217,934, and 6,717,673.

In addition to the mentioned color matching approaches, various devices have been proposed to aid in determining compatibility between various colors utilizing windows in a template.

A device from PPG Industries of Pittsburgh, Pa. labeled a "Color Checker" is also known in the art. The device includes a flexible magnetic template having two rectangular windows each measuring approximately 9.9 cm in length and 8.1 cm in height that are separated by a rectangular strip measuring approximately 1 cm in width. U.S. Pat. No. 6,994,553 discloses a paint color card having a substrate with a surface coated with a layer of a colored coating composition formulated to have a dried color that is substantially similar to the dried color of a commercially-available paint composition. The paint color card has a plurality of perforations at least partially defining a chip section that may be detached or folded over to form a window.

Other devices are known, for example stencils that include sheet-like materials including apertures therein, see U.S. Pat. Nos. 5,816,269, 6,056,419, 6,625,935, 6,227,989, 6,230,880, 6,647,693, 6,820,546, and 6,854,915.

In view of the above, it would be desirable to provide a quick, qualitative, visual method for a painter or surface finisher to compare a proposed matching color with a target or desired color and, in addition, to determine if special painting techniques such as blending or feathering would be necessary. It would be additionally desirable to provide a painter with a method and device that allows for comparison between a proposed matching color and at least two different areas of the object to be matched, each including a target color.

SUMMARY OF THE INVENTION

In view of the above, it is an object of the present invention to provide a device and method for visually comparing a proposed color with a target color located on at least two areas on an object.

A further object is to provide a color matching device and method that allows for qualitative, visual comparison between a proposed color and a target color in both close proximity to the proposed color and at a further distance.

Yet another object of the present invention is to provide a device including a flexible template having at least three, and preferably three windows that are sized to facilitate visual comparison between the proposed color and at least two target colors.

Still another object of the present invention is to provide a template having three windows wherein a first separation distance between first and second windows is different than a second separation distance between second and third windows. In various embodiments the second separation distance is at least two times greater or at least five times greater than the first separation distance.

A further object of the present invention is to provide a template having a back surface that is provided with a composition for temporarily connecting the template to an object, wherein the composition includes for example a magnetic material or an adhesive.

Another object of the present invention is to provide a method for evaluating a color match between a proposed color and a target color including the steps of providing a template having three windows, locating a proposed color sample in a middle window, and locating a target color to be matched within the remaining two windows.

Another object of the present invention is to provide a method for evaluating a match between a proposed color and a target color including the step of visually evaluating a color difference between the colors viewed in the first and second windows and the color differences between the colors viewed in the second and third windows.

A further object of the present invention is to provide a method that includes a step of determining if the color match between the proposed color and the target color is acceptable.

Still another object of the present invention is to provide a method that includes the step of visually evaluating the color differences between the colors in the template windows at more than one angle by altering the user's line of sight relative to the plane of the template.

An additional object of the present invention is to provide a method utilizing a template containing three windows to find an acceptable color match, and applying paint to an area of an object.

Accordingly, one aspect of the present invention is a color matching device, comprising a flexible template having at least three windows, the windows extending from a front face through a back face of the template and adapted to allow a visual comparison of a color appearing through each of the windows, wherein a first separation distance is present between the first window and the second window, wherein a second separation distance is present between the second window and third window, and wherein the second separation distance is greater than the first separation distance.

Accordingly, a further aspect of the present invention is a method for evaluating a color match between a proposed color and a target color comprising the steps of obtaining a color matching device comprising a flexible template having at least three windows, the windows extending from a front face through a back face of the template and adapted to allow a visual comparison of a color appearing through each of the windows, wherein a first separation distance is present between the first window and the second window, wherein a second separation distance is present between the second window and third window, and wherein the second separation distance is greater than the first separation distance; locating a color matching sample having a proposed color within the second window; locating a substrate having a target color to be matched within each of the first and third windows; and visually evaluating a color difference between a) the proposed color in the second window and the target color in the first window and b) the proposed color in the second window and the target color in the third window.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

Figure 1:
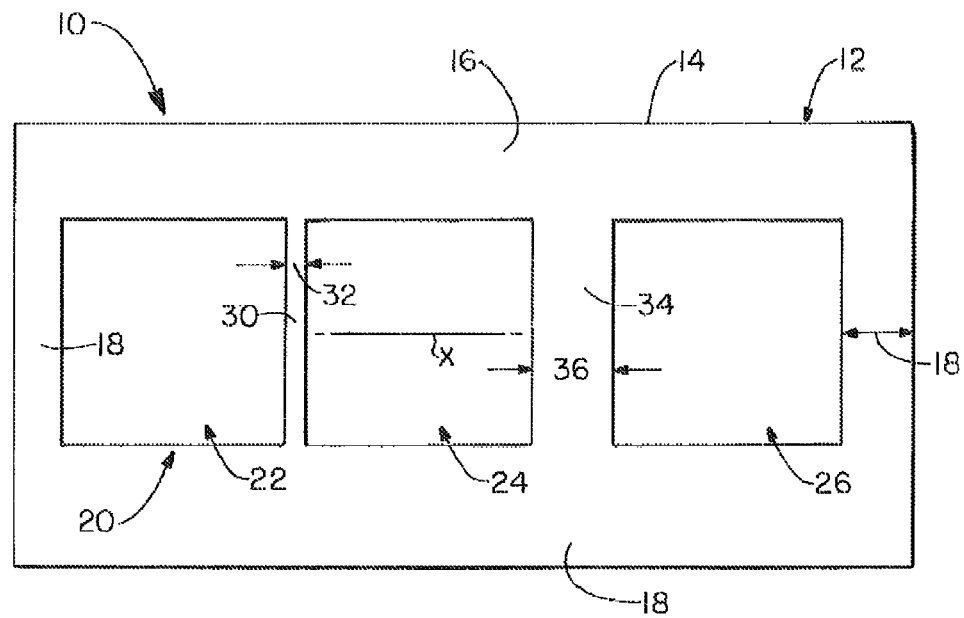
FIG. 1 is a plan view of a front side of one embodiment of a color matching template of the present invention including three color observation windows.
Figure 2:
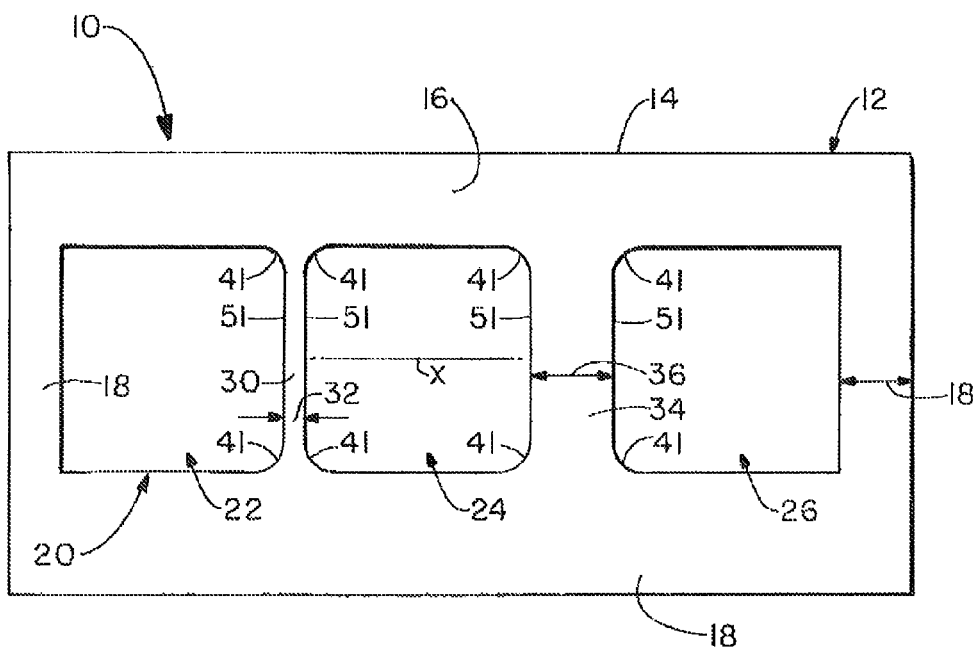
FIG. 2 is a plan view of a front side of a further embodiment of a color matching template including three windows having a substantially rectangular shape.

With reference to FIGS. 1 and 2, a color matching device 10 is shown in plan view. The color matching device 10 includes a template 12 having at least three, and preferably three windows 20, for example a first window 22, a second window 24 and a third window 26.

The template 12 is illustrated having a rectangular outer perimeter 14. However, it is to be understood that the perimeter can have other shapes, for example, but not limited to, a square shape, an elliptical shape, a circular shape, etc. A template 12 having a rectangular perimeter 14 is useful in one embodiment.

The windows 20 extend from a front face 16 of the template 12 through a back face (not shown) and thus form apertures or openings in the template. The windows 20 are each sized to permit a user to view a color appearing in the window. Thus, the dimensions of each window can vary and can be any dimensions that permit color identification and comparison between the windows. In order to accommodate a standard color chip, in a useful embodiment a window has dimensions of at least 1.9 cm by 4.2 cm. In one embodiment a window can have a length that ranges from about 5 cm to about 7.6 cm. In one embodiment, the windows present are equally sized, to provide visual comparisons without potential distraction from different size windows.

In one embodiment, each of the windows present is substantially the same size. The shape of each window can vary. Windows 22, 24 and 26 illustrated in FIG. 1 have a rectangular, more specifically square, shape, which is preferred in one embodiment. Other suitable window shapes include, but are not limited to circles, ellipses, and triangles. FIG. 2 illustrates windows 22, 24, and 26 having a substantially rectangular shape, wherein a majority of the length of each side is straight and curved edges are present. The curved edges provide the template with good strength. As further described hereinbelow, the majority of the length of both window edges adjacent to the first spacer and both window edges adjacent to the second spacer for each window provide parallel lines, so that the separation between the two windows is constant, and provides for desirable viewing conditions.

In one embodiment the windows 22, 24 and 26 are arranged along an axis, see for example longitudinal axis X of the template 14 in FIGS. 1 and 2. With respect to the axis on which the windows are arranged, the first window 22 and second window 24 are separated by a first spacer 30 and thus a first separation distance 32. Stated in another manner, the first window has a right border, having a portion perpendicular to the X axis, that is spaced from the left border, also having a portion perpendicular to the X axis, of the second window by the first separation distance 32. Also with respect to the axis on which the windows are arranged, the second window 24 and third window 26 are separated by a second spacer 34 and a second separation distance 36. The second separation distance 36 extends between the right border of the second window 24 having a portion that is disposed perpendicular to the X axis and the left border of the third window 26 having a portion which is also disposed perpendicular to the X axis. In the embodiment illustrated in FIG. 1, the first spacer 30 and the second spacer 34 are substantially rectangular strips that separate the windows. Although the strips are illustrated as being rectangular, in other embodiments, the spacers may have irregular borders between windows in which case the respective separation distance refers to a minimum distance between windows, measured parallel to the longitudinal axis. For example, template 10 illustrated in FIG. 2 includes first spacer 30 and second spacer 34 that have edges that are substantially rectangular and include curved edges 41 and parallel lines 51. The spacer edges between windows are generally parallel along the majority of the length thereof, desirably parallel along at least 50% of the length, and preferably parallel along at least 75% of the length. At least a sufficient length of the sides of the windows adjacent to the middle window should be a consistent separation to allow for comparison.

In one aspect of the present invention, the first separation distance 32 located between the first window 22 and the second window 24 is different than the second separation distance 36 located between the second window 24 and the third window 26. Preferably, the second separation distance 36 is greater than the first separation distance 32. When the color matching device 10 is utilized to assess the differences in color between a target color and a proposed color, the proposed color is preferably located within the second window 24 and a target color located within the first and third windows 22, 26. In this manner, the proposed color can be evaluated with a target color located relatively close in relation thereto, as well as a second target color located further away from the proposed color than the target color in the first window. An advantage of having at least two different separation distances is that it aids the decision-making process of the user or applicator. If the user obtains at least one suitable subjective visual match, for example between the first window and the second window, the user learns that the target color is very close and will be a good match without any special spray techniques, or between the second window and the third window, but not between the first and second windows, the user learns that the color match will be acceptable when he or she uses special application techniques, such as blending or feathering.

In one useful embodiment, the first separation distance 32 or the maximum width of the first spacer measured parallel to the longitudinal axis X is generally less than 10 mm, desirably from about 1.0 mm to about 9 mm, and often from about 2.5 mm to about 7.5 mm, and in one embodiment about 5 mm. The 5 mm distance is practical in a real life sense since 5 mm is generally considered a minimal distance between two panels for determining a visual difference, and the approximate distance of many seams on a vehicle, such as a door jamb.

In one useful embodiment, the second separation distance 34 or the maximum width of the second spacer measured parallel to the longitudinal axis X is generally greater than 20 mm, desirably from about 20 mm to about 30 mm, often from about 22 mm to about 28 mm, and in one embodiment is about 25 mm. 25 mm is a representative distance of many vehicle trim pieces, and also a practical distance between two panels for determining color difference.

In order to aid in color matching, it is desirable to provide the template with a border 18 extending between an edge of a window and the perimeter 14 of the template that is of a sufficient distance to separate the window from an adjacent substrate to promote desirable viewing of the colors located within the windows. The width of the border, i.e. the distance between the perimeter of the template and an edge of a window, at a given location can vary and should be sufficient to provide visual separation to allow comparison of the colors within the windows without undue distraction from the surroundings. In one embodiment, the border has a width of at least 15 mm. In a further embodiment, the border has a width about the same as the largest separation distance between the windows.

The front face 16 of the template 12 can be provided with a relatively neutral color that provides for minimal distraction of the user who is assessing colors within the windows of the device. The color of the front face 16 of the template 12 can vary depending upon the colors being viewed within the windows. In one embodiment a light neutral color, such as a light gray color, is utilized, for example Munsell N7.

For some applications, it is useful to attach the template 12 to the substrate so that the substrate color can be viewed through the first and third windows, for example. Various structures can be utilized to facilitate attachment between the template 12 and a substrate. In one embodiment the back face of the template 12 is magnetic. In a further embodiment the back face of the template is provided with an adhesive, such as a pressure sensitive adhesive that allows the template to be removably attached to a substrate. Static attraction is utilized in one embodiment.

As indicated hereinabove, alternative window arrangements can be utilized. In one embodiment, four windows are utilized, wherein the third window of FIG. 1 or 2 is replaced with two windows, one located above the other. In another three window embodiment, the second window is located above the first window, separated by the first separation distance and the third window is arranged at a greater separation distance, second separation distance, from the second window than the first window. It is useful, however, to generally have all the windows in the same "line", for example along the X axis illustrated in the drawings, so that the comparisons are made at the same angles of viewing without having to rotate the template or the substrates, or have the viewer move around.

The template 12 of the present invention in one embodiment is preferably formed of a flexible material. In one embodiment, the template includes two or more flexible layers including a base layer having magnetic particles bound in a polymeric or rubber binder; and an upper layer including a sheet material formed from a polymer such as PVC, epoxy or polyurethane, or a paper-like material. Flexible templates are preferred when the substrate including the target color is not flat or planar, such as a surface of a vehicle. The term "flexible" when utilized herein refers to the ability of a template to substantially conform to a surface of a desired substrate.

The color matching device of the present invention provides a quick, qualitative, visual method for a user to compare a proposed matching color with a target color. The device also allows one to determine if any specialized painting techniques such as blending or feathering will be necessary. "Blending or feathering" as used herein refers to progressively applying less paint film build as the paint is applied from the repair area to the surrounding already painted areas to allow the underlying color to show through and make the color change gradual to provide an essentially invisible repair. Because color and appearance differences are more noticeable at very close proximity, the color matching device of the invention and the method for using the same can provide rapid visual comparison of the target and proposed colors and provide guidance to the paint or coating applicator of application techniques that allow one to compensate for any slight differences in color.

A process for evaluating a potential match between a proposed color and a target color involves one or more of the following steps. Starting with the user, i.e. a painter, in possession of or obtaining a color matching device of the present invention comprising a flexible template having at least three windows, the windows extending from a front face through a back face of the template, a first separation distance present between the first window and the second window and a second separation distance present between the second window and the third window, the second separation distance being greater than the first separation distance, a color matching sample having a proposed color is located within the second window of the template. The color matching sample can be derived from one of numerous sources, for example a panel having a proposed color spayed or otherwise coated thereon, or a previously prepared standard color card.

A target color is located within the remaining windows, i.e. the first and third windows. In one embodiment, the target colors are located on a substrate, such as a vehicle body panel. Locating the target color within the first and third windows in one embodiment involves removably affixing the template to a substrate such that the target colors appear within the first and third windows of the template.

After the desired colors or colored surfaces are located within the windows of the template, the user visually evaluates the color differences between the proposed color and the target colors. More specifically, the color difference between the target color viewed in the first window and the proposed color viewed in the second window is visually evaluated. Also, the color difference between the proposed color viewed in the second window and the target color viewed in the third window is visually evaluated. It is subsequently determined if the color match between the proposed color and the target colors is acceptable. Determination of acceptability of the color match can be made generally utilizing any rating system known to those of ordinary skill in the art. The determination can be made visually by a user, or utilizing another color matching device, for example a spectrophotometer. An important advantage of this system is as a quick visual check. As indicated above, the template and methods of the invention aid the decision-making process of the user. By using at least two separation distances, the user can obtain information quickly and decide if a color or paint is a good enough visual match and decide if special techniques would be needed or the paint should be retinted.

In one embodiment a user, typically a painter, would place a color card or a test panel containing a sprayed coating of an actual paint behind the center or second window of the template and subsequently place the template onto the surface of a substrate near an area that requires repair whereby an original, i.e. target, color is visible through the first and third windows. The user then determines if the proposed color is a visual match with each of the windows containing the target color, in one embodiment, by changing his or her line of vision over the surface of the template in order to alter the viewing angles. By assessing the color match between the proposed color and the target colors, the user can determine if the color match is acceptable or if an additional technique, such as blending or feathering is necessary or if the proposed color needs to be retinted or reselected. A reselected or retinted color can then be placed in the second window and the procedure repeated until a desirable color match is achieved.

After an acceptable color match has been obtained, paint or a coating is applied to a desired area of the substrate, such as to facilitate painting of a damaged part or finishing of a replacement part.

As the template is releasably connected to the substrate, in some embodiments, the template can be reused as desired.

While in accordance with the patent statutes, the best mode and preferred embodiment have been set forth, the scope of the invention is not limited thereto, but rather by the scope of the attached claims.

What is claimed is:

1. A color matching device, comprising:
   a flexible template having at least three substantially same size windows, the windows extending from a front face through a back face of the template and adapted to allow a visual comparison of a color appearing through each of the windows, wherein a first spacer defining a first separation distance is present between and solely separates the first window and the second window, wherein a second spacer defining a second separation distance is present between and solely separates the second window and third window, and wherein the second separation distance is greater than the first separation distance.

2. The color matching device according to claim 1, wherein the second separation distance is at least two times greater than the first separation distance.

3. The color matching device according to claim 2, wherein a second separation distance is at least five times greater than the first separation distance.

4. The color matching device according to claim 1, wherein the first separation distance is from about 1 mm to less than 9 mm, and wherein the second separation distance is from about 20 mm to about 30 mm.

5. The color matching device according to claim 4, wherein the first separation distance is from about 2.5 mm to about 7.5 mm, and wherein the second separation distance is from about 22 mm to about 28 mm.

6. The color matching device according to claim 4, wherein the windows are substantially rectangular and arranged along a longitudinal axis.

7. The color matching device according to claim 4, wherein the template has a border extending around the windows having a width measured from a perimeter of the template to an edge of a window of at least 15 mm.

8. The color matching device according to claim 1, wherein the front face is a neutral color.

9. The color matching device according to claim 1, wherein the back face includes one or more of a magnetic material and an adhesive.

10. The color matching device according to claim 1, wherein a first spacer having edges is present between the first window and the second window and a second spacer having edges is present between the second window and the third window, and wherein the first and second spacer edges are substantially parallel along a majority of a length of the spacer edges.

11. The color matching device according to claim 10, wherein the first and second spacer edges are parallel along at least 50% of the length of the spacer edges.

12. A method for evaluating a color match between a proposed color and a target color, comprising the steps of:
    obtaining a color matching device comprising a flexible template having at least three windows, the windows extending from a front face through a back face of the template and adapted to allow a visual comparison of a color appearing through each of the windows, wherein a first separation distance is present between the first window and the second window, wherein a second separation distance is present between the second window and third window, and wherein the second separation distance is greater than the first separation distance;
    locating a color matching sample having a proposed color within the second window;
    locating a substrate having a target color to be matched within each of the first and third windows; and
    visually evaluating a color difference between a) the proposed color in the second window and the target color in the first window and b) the proposed color in the second window and the target color in the third window.

13. The method according to claim 12, further including the step of determining if the color match between the proposed color and one of the target colors is acceptable.

14. The method according to claim 13, wherein the first separation distance is from about 1 mm to less than 9 mm, wherein the second separation distance is from about 20 mm to about 30 mm, and wherein the method further includes the step of applying paint to an area of the substrate.

15. The method according to claim 12, wherein the visual evaluation includes evaluating the color difference at more than one angle by altering a user's line of sight relative to a plane of the template.

16. The method according to claim 12, further including the step of releasably attaching the template to the substrate utilizing one or more of a magnetic material and an adhesive.

17. The method according to claim 12, wherein the first separation distance is from about 2.5 mm to about 7.5 mm, and wherein the second separation distance is from about 22 mm to about 28 mm.

18. The method according to claim 12, wherein locating the substrate within the first and third windows includes placing the template on a painted surface of a vehicle such that the target color is located in the first and third windows.

19. The method according to claim 12, wherein the template includes a first spacer having edges between the first window and the second window and a second spacer having edges between the second window and the third window, and wherein the first and second spacer edges are substantially parallel along a majority of a length of the spacer edges.

20. The method according to claim 19, further including the step of determining if the color match between the proposed color and one of the target colors is acceptable.

* * * * *